United States Patent [19]
Anders

[11] 3,937,495
[45] Feb. 10, 1976

[54] APPARATUS FOR CONNECTING AND SEALING TOGETHER TWO LENGTHS OF CYLINDER BARREL OF A WORM EXTRUDER

[75] Inventor: Dietmar Anders, Hannover-Kleefeld, Germany

[73] Assignee: Hermann Berstorff Maschinenbau GmbH, Hannover-Kleefeld, Germany

[22] Filed: Apr. 7, 1975

[21] Appl. No.: 565,952

[30] Foreign Application Priority Data
Apr. 18, 1974  Germany................... 7413472[U]

[52] U.S. Cl.............. 285/41; 285/133 R; 285/330; 285/363; 285/416; 165/156
[51] Int. Cl.² ....................................... F16L 53/00
[58] Field of Search.......... 285/41, 133 R, 138, 286, 285/330, 416, 363; 165/156, 169

[56] References Cited
UNITED STATES PATENTS

| 295,867 | 3/1884 | Griffen et al. | 285/41 X |
| 1,389,768 | 9/1921 | McFarland | 285/41 X |
| 1,497,652 | 6/1924 | Browne | 285/133 R X |
| 1,736,923 | 11/1929 | Lalonde | 285/133 R |
| 2,053,623 | 9/1936 | McKerroll | 165/156 X |

FOREIGN PATENTS OR APPLICATIONS

| 1,000,649 | 1/1957 | Germany | 285/41 |

*Primary Examiner*—Dave W. Arola
*Attorney, Agent, or Firm*—Donald D. Jeffery

[57] ABSTRACT

A ring to be interposed between the adjoining ends of two lengths of cylinder barrel of a worm extruder, each length of which comprises an inner cylindrical member and an outer cylindrical member disposed concentrically therewith with a duct for flow of heating and/or cooling fluid provided between the cylindrical members, the ring having an inside diameter corresponding to the inside diameter of the inner cylindrical member end faces, having sealing rings therein, to abut and seal against the end faces of the cylindrical members and a covered in recess in its periphery for connection to a source of heating and/or cooling members, clamping means being provided to pull the outer cylindrical members into abutment with the ring.

2 Claims, 1 Drawing Figure

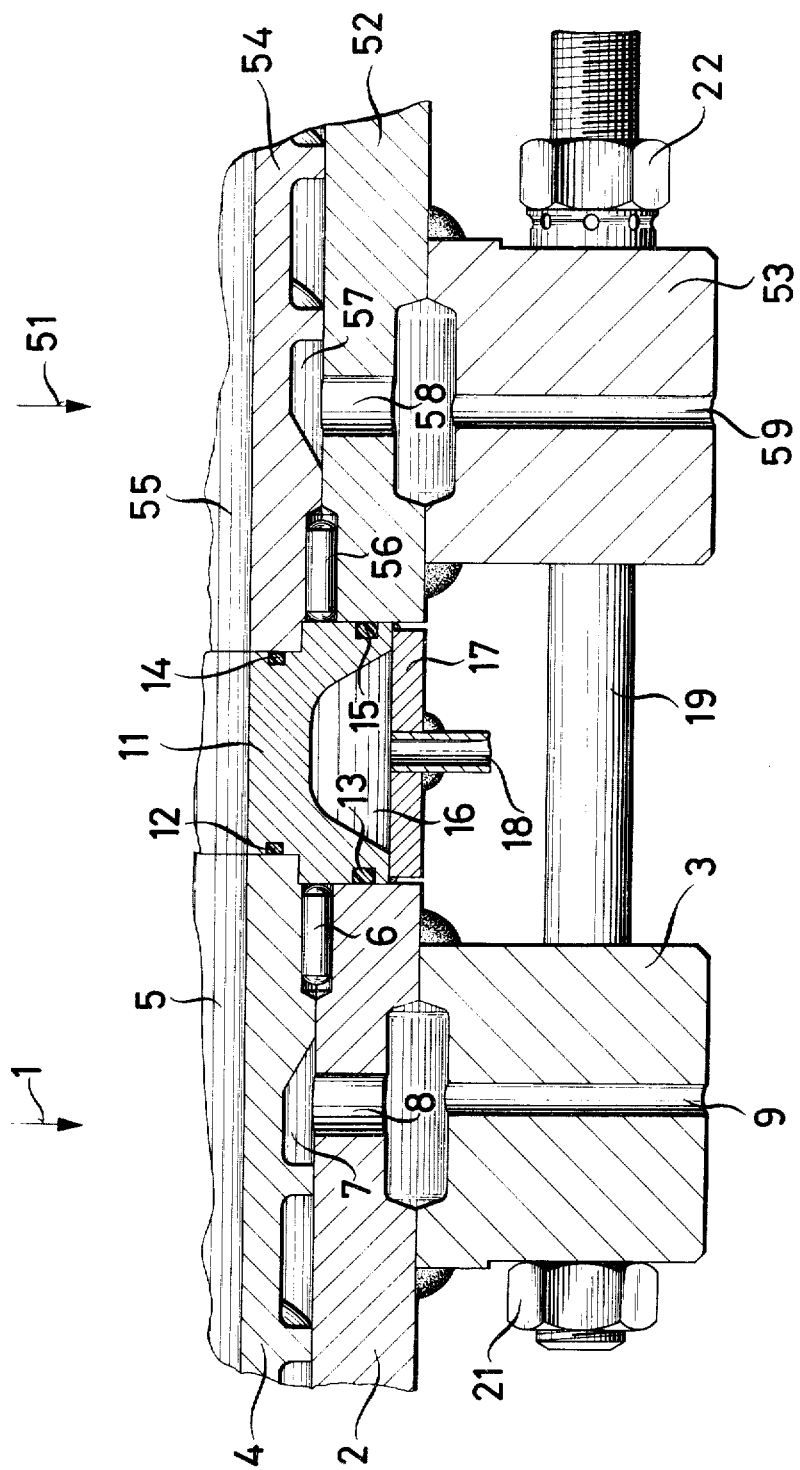

APPARATUS FOR CONNECTING AND SEALING TOGETHER TWO LENGTHS OF CYLINDER BARREL OF A WORM EXTRUDER

The invention relates to apparatus for connecting and sealing together two lengths of cylinder barrel of a worm extruder.

It has been proposed where two lengths of cylinder barrel each comprise an inner cylindrical member and, disposed concentrically therewith, an outer cylindrical member between which passages for flow of heating and/or cooling fluid are provided, for the two lengths to be connected and sealed together using a stuffing box packing disposed between the ends of the cylindrical members. This complicated stuffing box packing has the disadvantage that the passages for flow of heating and/or cooling fluid are discontinued in the region of the stuffing box packing. In this zone, the worm cylinder cannot therefore be maintained at a temperature in keeping with the requirements imposed by the material being processed. The consequences are a reduction in the quality of the extruded product.

A further disadvantage of the stuffing box packing arrangement is that, despite constant application of elastic pressure, the stuffing box packing cannot compensate rapidly enough for changes in diameter caused by rapid temperature changes, when the inner cylindrical member is thin-walled and the outer cylindrical member is thick-walled. Leaks occur which can cause faults in the heating and/or cooling arrangements.

According to the invention, there is provided apparatus for connecting and sealing together two lengths of cylinder barrel of a worm extruder, each length of cylinder barrel comprising an inner cylindrical member and an outer cylindrical member disposed concentrically there-around with a duct or ducts for heating and/or cooling fluid provided between the inner member and the outer member, the apparatus comprising a ring to engage between adjoining ends of the two lengths of cylinder barrel, the ring having an inside diameter which corresponds to the inside diameter of the inner cylindrical members, end faces to abut end faces of the outer and inner cylindrical members with sealing rings between the abutting faces, and a covered-in circumferential recess in its periphery which can be connected to a heating or cooling fluid system, and clamping means at the ends of the outer cylindrical members to clamp the ring between the outer cylindrical members.

Preferably, the inner cylindrical members project axially beyond the outer cylindrical members and the end faces of the ring which abut end faces of the inner cylindrical members are spaced a lesser distance apart than are the end faces of the ring which abut the outer cylindrical members.

Such apparatus can permit adequate heating and/or cooling at the position of connection of two lengths of cylinder barrel and indeed from end to end of the cylinder barrel, while always providing for an adequate sealing effect.

Even when there are different variations in diameter with respect to the inner and outer cylindrical members, due to different wall thicknesses, the apparatus can always retain an effective sealing action.

The invention is diagrammatically illustrated by way of example in the accompanying drawing, which is a sectional view through two lengths of extruder barrel joined by apparatus according to the invention.

Referring to the drawing, two lengths of extruder cylinder barrel 1 and 51, only the mutually facing ends of which are shown, each have an outer cylindrical member 2, 52. Welded on the periphery of the end of the outer cylinder part 2, 52 are bored annular flanges 3, 53, only one of which is shown on each length of barrel. Fitted into the outer cylindrical member 2, 52 is an inner cylindrical member 4, 54, the bore 5, 55 of which accommodates the extruder worm (not shown). The concentrically-disposed cylindrical members 2, 52 and 4, 54, are secured by pins 6, 56 against relative rotation.

The inner cylindrical member 4, 54 has, machined in its outer surface, a spiral duct 7, 57 for heating or cooling fluid which communicates through a radial bore 8, 58 in the outer cylindrical member 2, 52 and a connecting bore 9, 59 in the annular flange 3, 53, with a heating or cooling fluid system (not shown).

Disposed between the two lengths of barrel 1, 51 is an intermediate ring 11, the inside diameter of which corresponds to the inside diameter of the inner cylinder parts 2 and 52. The ring 11 is stepped on its two end faces and carries a respective groove in each of stepped end faces formed thereby a sealing ring 12, 13, 14, 15. The ends of the outer and inner cylindrical members 2, 52 and 4, 54 abut the ring 11 and press against the sealing rings.

Recessed in the periphery of the ring 11 is a channel 16 which is covered-in by a welded-on cover plate 17. The recessed channel 16 can be fed with a heating or cooling fluid through a pipe connection 18, only one of which is shown, secured in the cover plate 17.

A clamping arrangement is provided to maintain a connection of the lengths of cylinder barrel and comprises bolts 19 passed through bores (not shown) in the annular flanges 3 and 53. Nuts 21, 22 on the bolt can be tightened to pull the lengths of cylinder barrel firmly against the ring 11.

What is claimed is:

1. Apparatus for connecting and sealing together two lengths of a cylinder barrel of a worm extruder, each length of cylinder barrel comprising an inner cylindrical member and an outer cylindrical member disposed concentrically there-around with at least one duct for flow of temperature controlling fluid provided between said inner cylindrical member and said outer cylindrical member, said apparatus comprising a ring having end faces engaging between adjoining ends of said two lengths of cylinder barrel, said ring having an inner and outer periphery, said ring inner periphery having an inside diameter which corresponds to the inside diameter of said inner cylindrical members, said ring end faces abutting end faces of said outer and inner cylindrical members and sealing rings between the abutting faces, said ring being formed with a circumferential recess in its outer periphery, and means attached to the outer periphery of said ring covering said recess, means communicating with said recess which can be connected to a source of temperature controlling fluid, and clamping means at the ends of said outer cylindrical members clamping said ring sealingly between said outer and inner cylindrical members.

2. Apparatus as claimed in claim 1, wherein said inner cylindrical members project axially beyond said outer cylindrical members and the end faces of said ring which abut end faces of said inner cylindrical members are spaced a lesser distance apart than are the end faces of said ring which abut said outer cylindrical members.

* * * * *